(12) United States Patent
Kuros et al.

(10) Patent No.: US 9,217,505 B2
(45) Date of Patent: Dec. 22, 2015

(54) SYSTEM AND METHOD FOR ENHANCING THE OPERATION OF A CONTINUOUSLY VARIABLE TRANSMISSION OF A WORK VEHICLE

(71) Applicant: CNH Industrial America, LLC, New Holland, PA (US)

(72) Inventors: Pawel Kuros, Wood Dale, IL (US); Peter Dix, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/468,529

(22) Filed: Aug. 26, 2014

(65) Prior Publication Data

US 2015/0112558 A1   Apr. 23, 2015

Related U.S. Application Data

(60) Provisional application No. 61/893,313, filed on Oct. 21, 2013.

(51) Int. Cl.

| | |
|---|---|
| *F16H 61/02* | (2006.01) |
| *F16H 61/66* | (2006.01) |
| *F16D 48/06* | (2006.01) |
| *F16H 47/04* | (2006.01) |
| *F16H 37/08* | (2006.01) |

(52) U.S. Cl.
CPC ............. *F16H 61/66* (2013.01); *F16D 48/06* (2013.01); *F16H 47/04* (2013.01); *F16H 61/0204* (2013.01); *F16D 2500/5116* (2013.01); *F16H 2037/0886* (2013.01); *F16H 2037/0893* (2013.01)

(58) Field of Classification Search
None
See application file for complete search history.

(56) References Cited

U.S. PATENT DOCUMENTS

| | | | | |
|---|---|---|---|---|
| 3,398,605 | A | * | 8/1968 | Ainsworth et al. ............. 475/80 |
| 3,496,803 | A | * | 2/1970 | Whelahan ......................... 477/1 |
| 3,855,879 | A | * | 12/1974 | DeLalio .......................... 475/82 |
| 4,989,471 | A | | 2/1991 | Bulgrien |
| 5,888,162 | A | * | 3/1999 | Moeller et al. .................. 475/72 |
| 6,626,036 | B2 | | 9/2003 | Milender et al. |
| 2011/0313630 | A1 | | 12/2011 | Stoller et al. |
| 2012/0158264 | A1 | | 6/2012 | Kuras et al. |

FOREIGN PATENT DOCUMENTS

| | | |
|---|---|---|
| WO | WO 2013/029056 A1 | 2/2013 |
| WO | WO 2013/029058 A1 | 2/2013 |

\* cited by examiner

*Primary Examiner* — Justin Holmes
(74) *Attorney, Agent, or Firm* — Sue C. Watson

(57) ABSTRACT

In one aspect, a computer-implemented method for enhancing the performance of a continuously variable transmission of a work vehicle may include engaging a range clutch of the continuously variable transmission, cycling a directional clutch of the continuously variable transmission between an engaged state and a disengaged state while the range clutch is engaged and controlling a position of a swash plate of the continuously variable transmission such that a ground speed of the work vehicle is maintained substantially at zero while the directional clutch is cycled between the engaged and disengaged states.

17 Claims, 5 Drawing Sheets

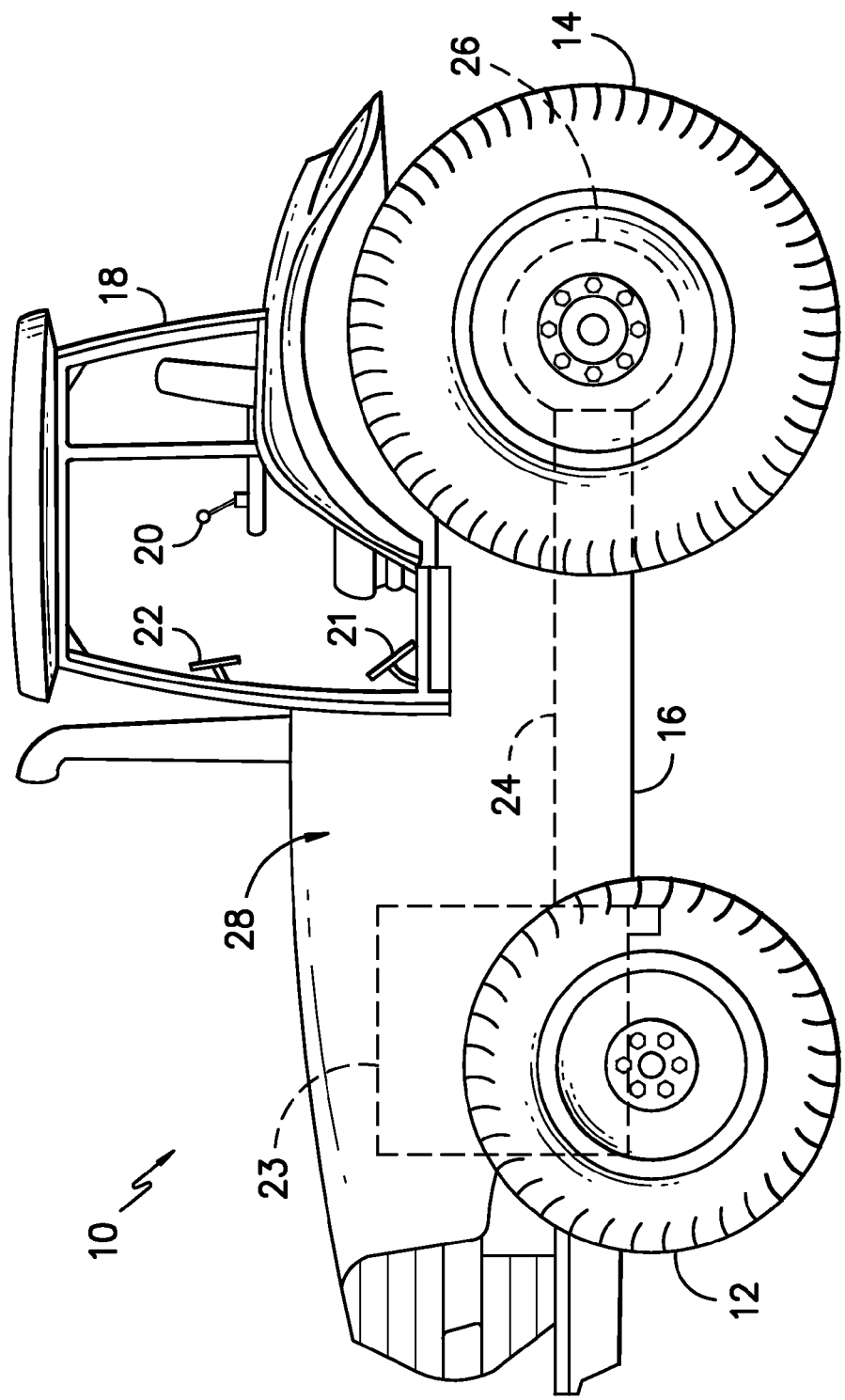
FIG. -1-

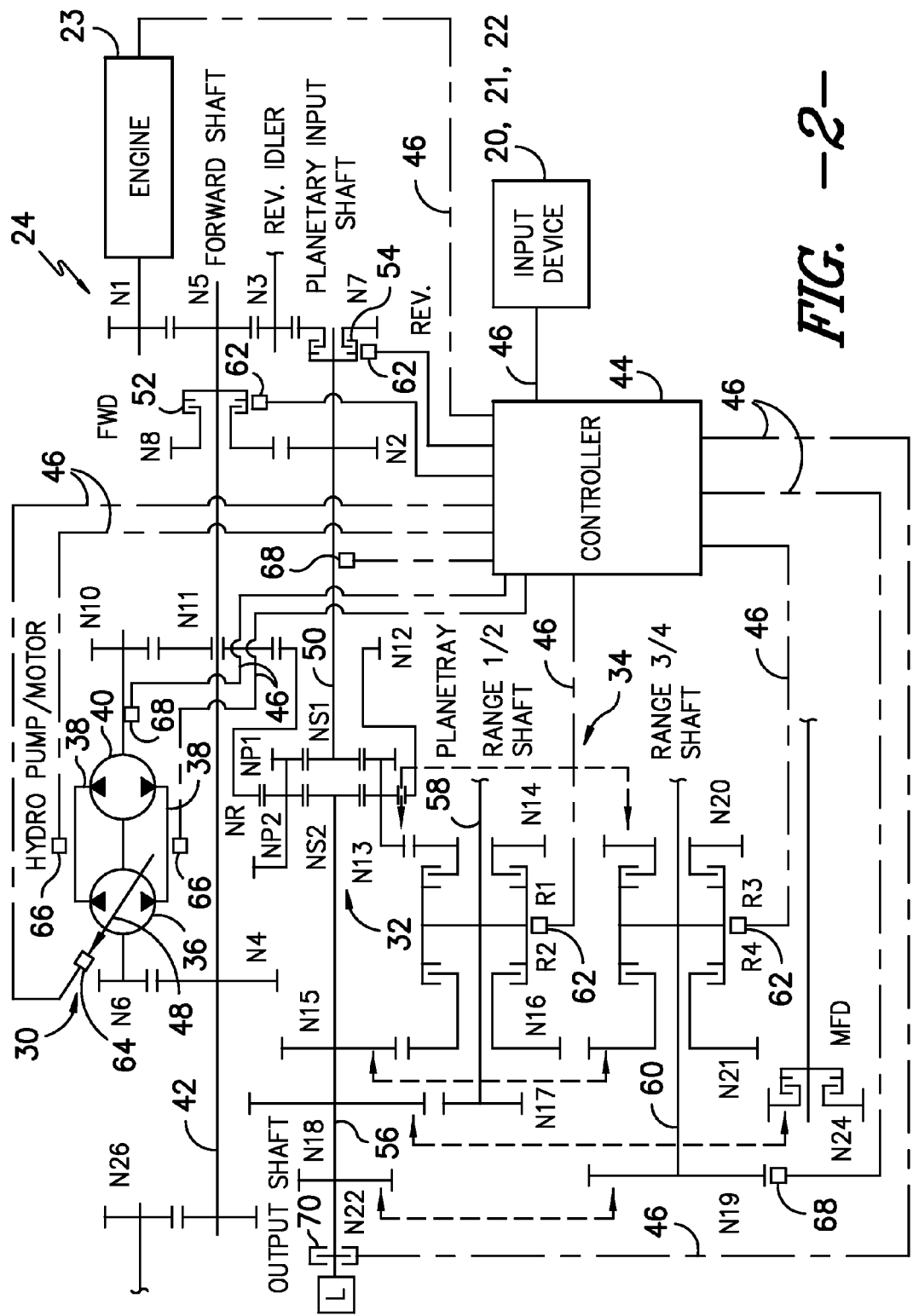
FIG. -2-

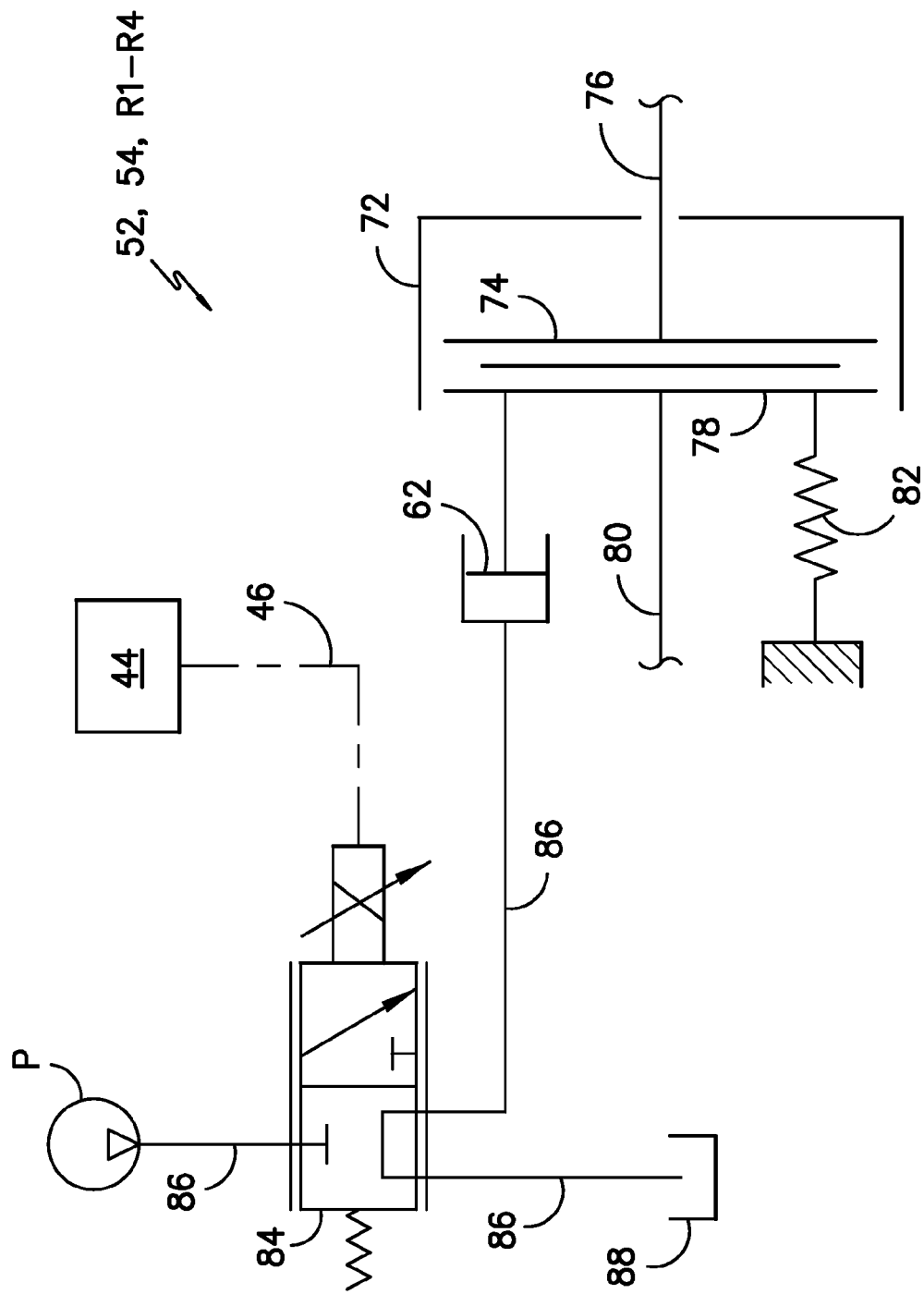
FIG. -3-

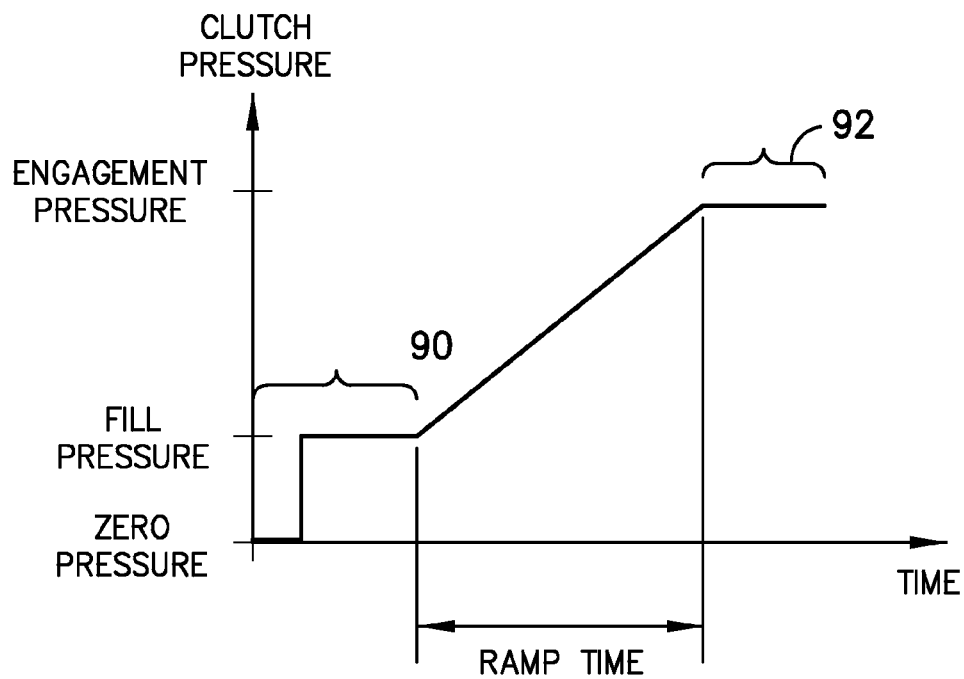
FIG. -4-
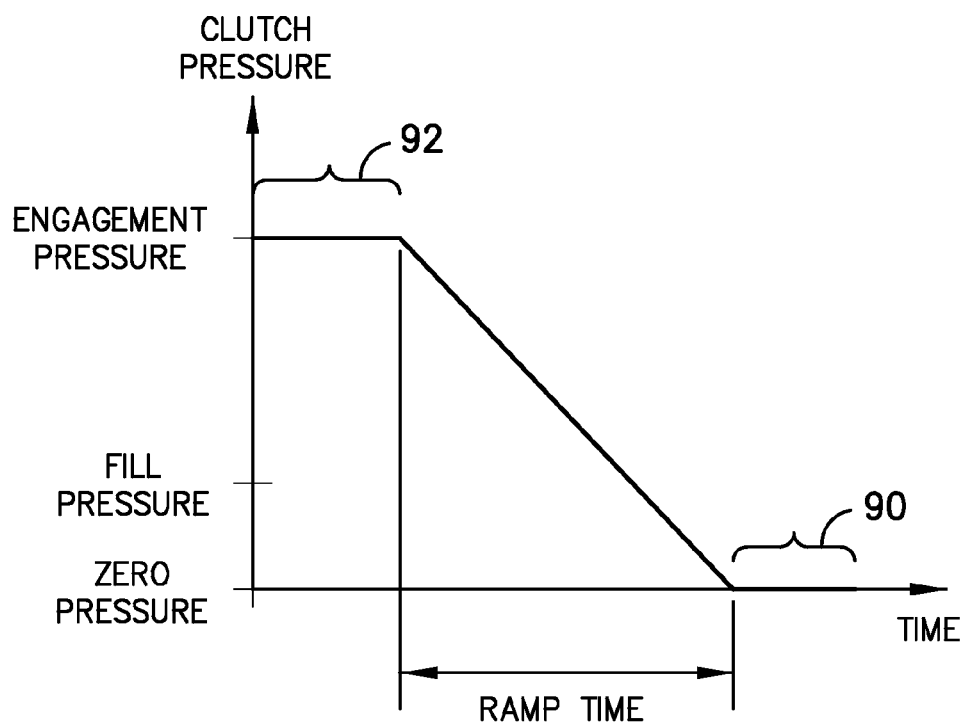
FIG. -5-

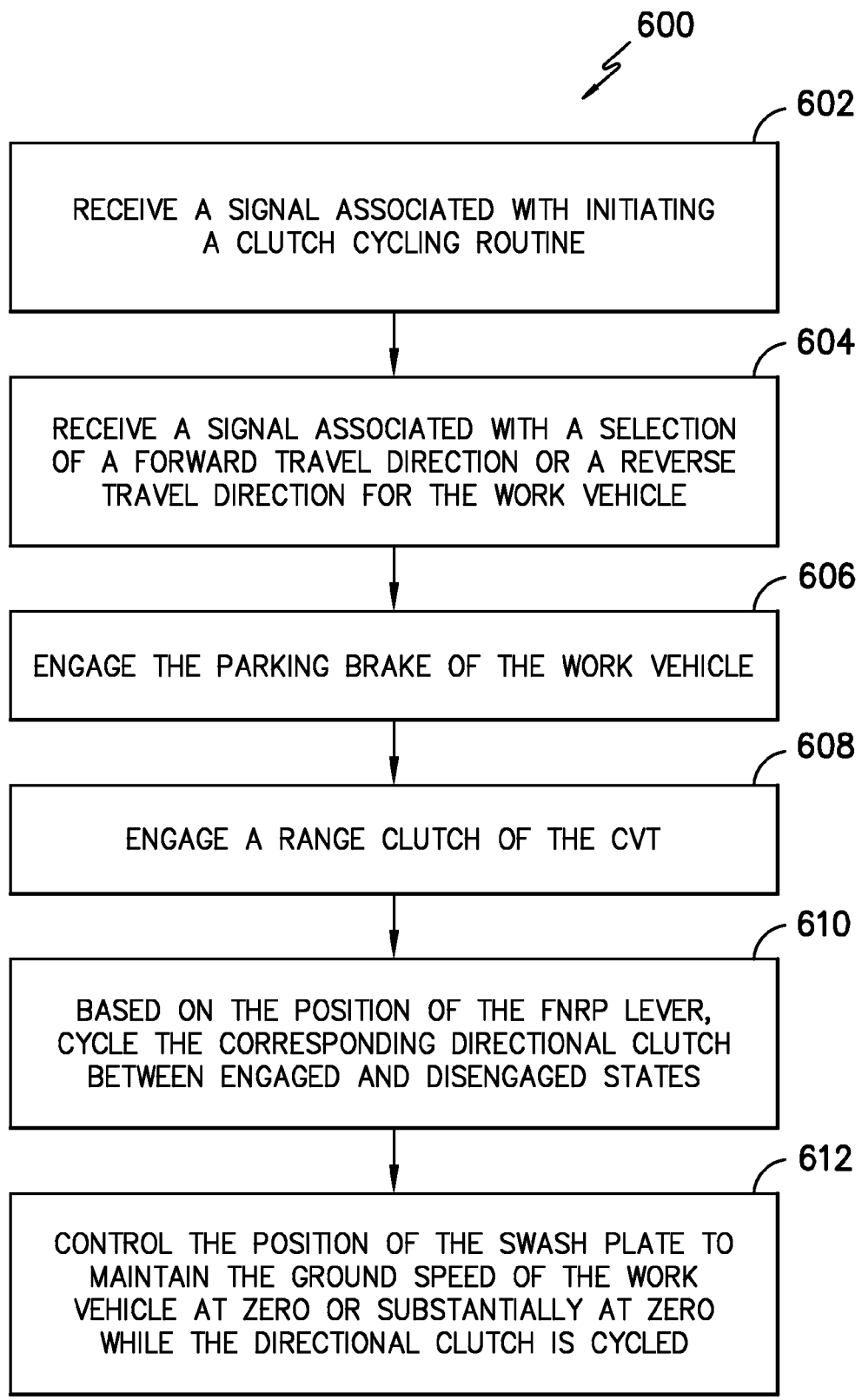
FIG. -6-

SYSTEM AND METHOD FOR ENHANCING THE OPERATION OF A CONTINUOUSLY VARIABLE TRANSMISSION OF A WORK VEHICLE

FIELD OF THE INVENTION

The present subject matter relates generally to continuously variable transmissions (CVTs) utilized within work vehicles and, more particularly, to a system and method for enhancing the operation of a work vehicle CVT.

BACKGROUND OF THE INVENTION

Transmissions with hydraulically operated clutches (e.g., continuously variable transmissions (CVTs)) are well known in the art. When operating such transmissions, it is important to accurately control clutch engagement in order to provide the desired vehicle performance. However, due to tolerances within the clutch valve and errors associated with the controller's ability to command the correct current, the pressure needed to move the clutch's actuator (e.g., a hydraulically actuated piston) to the point at which the clutch plates touch and the clutch begins to transmit torque can vary significantly. As a result, it is often necessary to calibrate transmission clutches to ensure that the proper clutch pressures are being supplied for engaging each clutch.

When performing a clutch calibration, the accuracy of the calibration process may often be impacted by imperfections, inconsistencies and/or other mechanical and relates issues within the transmission. For example, air bubbles/pockets trapped within the hydraulic system can cause a clutch to calibrate to a different current value than the value that will be required once the trapped air has been removed. Similarly, mechanical issues, such as friction between one or more of the clutch components, shifting of one or more of the clutch components at start-up, the lack of or excessive seal wear, burrs on metal components and/or the like, may also result in inaccuracies within clutch calibration values.

Accordingly, a system and method that enhances the operation of a CVT, such as by allowing more accurate clutch calibrations to be performed, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a computer-implemented method for enhancing the performance of a continuously variable transmission of a work vehicle. The method may generally include engaging a range clutch of the continuously variable transmission, cycling a directional clutch of the continuously variable transmission between an engaged state and a disengaged state while the range clutch is engaged and controlling a position of a swash plate of the continuously variable transmission such that a ground speed of the work vehicle is maintained substantially at zero while the directional clutch is cycled between the engaged and disengaged states.

In another aspect, the present subject matter is directed to a computer-implemented method for enhancing the performance of a continuously variable transmission of a work vehicle. The method may generally include engaging a directional clutch of the continuously variable transmission, cycling a range clutch of the continuously variable transmission between an engaged state and a disengaged state while the directional clutch is engaged and controlling a position of a swash plate of the continuously variable transmission such that a ground speed of the work vehicle is maintained substantially at zero while the range clutch is cycled between the engaged and disengaged states.

In a further aspect, the present subject matter is directed to a system for enhancing the performance of a work vehicle. The system may include a continuously variable transmission having a first directional clutch, a second directional clutch and a plurality of range clutches. The transmission may also include a hydrostatic power unit having a pump in fluid communication with a motor. The pump may include a swash plate. The system may also include a controller communicatively coupled to the first directional clutch, the second directional clutch, the plurality of range clutches and the hydrostatic power unit. The controller may be configured to engage one of the plurality of range clutches, cycle the first directional clutch between an engaged state and a disengaged state while the range clutch is engaged and control a position of the swash plate such that a ground speed of the work vehicle is maintained substantially at zero while the first directional clutch is cycled between the engaged and disengaged states.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle;

FIG. 2 illustrates a schematic view of one embodiment of a continuously variable transmission suitable for use within the work vehicle shown in FIG. 1;

FIG. 3 illustrates a schematic view of one embodiment of a suitable clutch configuration that may be used with the clutches of the transmission shown in FIG. 2;

FIG. 4 illustrates a simplified graph providing one example of the change in clutch pressure that occurs over time when a transmission clutch is switched from a disengaged state to an engaged state;

FIG. 5 illustrates a simplified graph providing one example of the change in clutch pressure that occurs over time when a transmission clutch is switched from an engaged state to a disengaged state; and FIG. 6 illustrates a flow diagram of one embodiment of a method for enhancing the operation of a continuously variable transmission in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for enhancing the operation of a continuously variable transmission (CVT) of a work vehicle. Specifically, in several embodiments, the disclosed system and method may provide a means for automatically and repeatedly cycling one or more clutches of the CVT between engaged and disengaged states, which may allow for the CVT to be broken-in and/or warmed-up prior to operation of the work vehicle and/or prior to the performance of a maintenance operation on the CVT. For instance, for both new and old work vehicles, various system inconsistencies, imperfections and/or other issues may be present due to non-use, wear, manufacturing tolerances and/or the like. Such issues may, for example, include, but are not limited to, air bubbles/pockets trapped in the fluid lines and/or other components of the hydraulic system, friction between one or more of the clutch components, shifting of one or more of the clutch components at start-up, the lack of or excessive seal wear, burrs on metal components and/or the like. By cycling one or more of the transmission clutches in accordance with aspects of the present subject matter, such issues may be eliminated or, at the very least, their impact on the overall performance of the transmission may be reduced.

For example, clutch calibrations are often performed on brand new vehicles at the manufacturing plant by plant technicians. When performing such a calibration on a newly manufactured vehicle, it is often the case that small bubbles or pockets of air may be trapped within one or more of the components of the hydraulic system (e.g., within the valve, fluid lines and/or the clutch actuator), which leads to inaccuracies in the resulting clutch calibration values. For instance, while the air is trapped within the system, it may be determined during the calibration that a specific current command is needed to properly engage a given clutch. However, when the air is no longer within the system (e.g., after several hours of operation), the current command resulting from the calibration may no longer be adequate to achieve the required clutch torque. Similarly, for work vehicles that have been operating in the field for an extended period of time, mechanical issues and/or imperfections (e.g., friction, metal burrs, shifting components, uneven seal wear, etc.) may be present that can lead to similar inaccuracies in subsequent clutch calibrations performed by service technicians. Thus, in accordance with aspects of the present subject matter, one or more of the clutches of a CVT may be cycled immediately prior to the performance of a clutch calibration to flush out any trapped air and/or to eliminate any mechanical or other issues. As a result, the accuracy of the subsequent clutch calibration may be significantly improved, thereby allow for the overall operation of the CVT to be enhanced.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 1, the work vehicle 10 may include a Forward-Neutral-Reverse-Park (FNRP) lever 20 and a clutch pedal 21. In addition, the work vehicle 10 may include a display panel 22 for displaying message windows and/or alerts to the operator and/or for allowing the operator to interface with the vehicle's controller. For instance, in one embodiment, the display panel 22 may include a touch screen and/or associated buttons or other input devices that allow the operator to provide user inputs to the controller.

Moreover, the work vehicle 10 may include an engine 23 and a transmission 24 mounted on the chassis 16. The transmission 24 may be operably coupled to the engine 23 and may provide variably adjusted gear ratios for transferring engine power to the wheels 14 via an axle/differential 26. The engine 23, transmission 24, and axle/differential 26 may collectively define a drivetrain 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 23, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Referring now to FIG. 2, a schematic diagram of one embodiment of a continuously variable transmission 24 suitable for use with the work vehicle 10 described above is illustrated in accordance with aspects of the present subject matter. As shown, the transmission 24 may include a hydrostatic power unit 30 and a planetary power unit 32. The hydrostatic power unit 30 and the planetary power unit 32 may be coupled to a driveline including a range gear set 34 and may also be coupled to a load L. For example, in one embodiment, the load L may correspond to the drive wheels of the work vehicle 10 (e.g., the front and/or rear wheels 12, 14 of the work vehicle 10). Alternatively, the hydrostatic power unit 30 and the planetary power unit 32 may be coupled to any other suitable load L, such as loads that include a track drive or a separate operating system of the work vehicle 10.

The hydrostatic power unit 30 of the transmission 10 may generally include a fluid pump 36 coupled by fluid conduits 38 in a closed loop to a fluid motor 40. The motor 40 may be coupled to the engine 23 via an input gear N6. Specifically, as shown in FIG. 2, power may be transmitted to the hydrostatic power unit 30 by a driven gear N4 mounted on a forward shaft 42 of the transmission 10 and engaged with the input gear N6. In addition, an output gear N10 for the hydrostatic power unit 30 may be connected to a ring gear NR of the planetary power unit 32 via gears N11 and N12. A power take off (PTO) of the vehicle 10 may also be coupled to the engine 23 through the forward shaft 42 (e.g., by coupling a PTO gear reduction N26 to the forward shaft 42, which is coupled to the engine 23 via gears N5 and N1.

In general, the pump 36 may comprise any suitable electronically controlled pump known in the art, such as an electronically controlled variable displacement hydraulic pump. As such, operation of the pump 36 may be automatically controlled using an electronic controller 44 of the work machine 10. For example, as shown in FIG. 2, the controller 44 may be communicatively coupled to the pump 36 via a suitable communicative link 46 so that the angle of a swash plate of the pump 36 (the swash plate being denoted by a diagonal arrow 48 through pump 36) may be adjusted through a range of positions, thereby adjusting the transmission ratio of the transmission 24.

It should be appreciated the controller 44 may generally comprise any suitable processor-based device known in the art. Thus, in several embodiments, the controller 44 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 44 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 44 to perform various computer-implemented functions, such as the method 600 described below with reference to FIG. 6. In addition, the controller 44 may also include various other suitable components, such as a communications circuit or module, one or more input/output channels, a data/control bus and/or the like.

Referring still to FIG. 2, the planetary power unit 32 of the transmission 24 may generally include a primary sun gear NS1 mounted on a planetary input shaft 50. As shown, the planetary input shaft 50 may be coupled to the engine 23 via a forward directional clutch 52 or a reverse directional clutch 54. In addition, the planetary power unit 32 may be configured to be selectively coupled to the load L, coupled to the hydrostatic power unit 30 and selectively coupled to the engine 23, all under automatic control of the controller 44. For example, for coupling the planetary power unit 32 to the load L, the transmission 24 may include an output shaft 56 coupled to the load L which carries an input gear N18 engaged with an output gear N17 on a range ½ shaft 58 of the range gear set 34 and a gear N22 engaged with a gear N19 on a range ¾ shaft 60 of the range gear set 34. The range ½ shaft 58 may, in turn, be coupled to the planetary power unit 32 via automatic operation of range selectors or clutches R1 and R2 for power flow through gears N13 and N14, or N15 and N16, respectively. Similarly, the range ¾ shaft 60 may be coupled to the planetary power unit 32 via range selectors or clutches R3 and R4 for power flow via gears N13 and N20, or N15 and N21, respectively. The range ½ and ¾ shafts 58, 60 may also be simultaneously coupled to the planetary power unit 32 to provide dual power flow. It should be appreciated that operation of the various clutches (e.g., the forward directional clutch 52, the reverse directional clutch 54, and clutches R1, R2, R3 and R4) may be automatically controlled by the controller 44 using suitable actuators 62 (e.g., hydraulic pistons) communicatively coupled to the controller 44 via suitable communicative links 46.

The controller 44 may also be communicatively coupled to a swash plate actuator 64 for automatically controlling the position or angle of the swash plate 48 of the pump 36. For example, the actuator 64 may be configured to move the swash plate 48 across a range of angles in response to control signals (e.g., current commands) received from the controller 44. In addition, the controller 44 may be coupled to any number of sensors for monitoring the various operating parameters of the transmission 24 including, but not limited to, pressure transducers or sensors 66 for sensing the pressure within the conduits 38 connecting the pump 36 to the motor 40 and/or for sensing the pressure of the hydraulic fluid within the various clutches of the transmission 24, speed sensors 68 for sensing speeds of the various shafts of the transmission 24 (e.g., by sensing the motor speed of the fluid motor 40), temperature sensors for sensing the temperature of one or more fluids within the transmission 24 and/or any other suitable sensors. Similarly, the controller 44 may also be connected to the engine 23 (e.g., a speed governor of the engine 23) for receiving engine speed data and other information therefrom.

Additionally, as shown in FIG. 2, the controller 44 may also be communicatively coupled to the operator-controlled input device(s) 20, 21, 22 positioned within the cab 18 via a suitable communicative link 46. For example, the controller 44 may be coupled to the FRNP lever 20, the clutch pedal 21, the display panel 22 and/or any other suitable input device of the vehicle 10 (e.g., the speed control lever or pedal, the engine throttle lever, the neutral button and/or any other suitable lever, pedal, button or control panel of the vehicle 10).

During operation, the transmission 24 may be operated to have a combined hydrostatic and mechanical power flow by engaging the reverse directional clutch 54 to the power planetary power unit 32 via gears N1, N3, N5 and N7, or engaging the forward directional clutch 52 to power the power planetary power unit 32 via gears N1, N8, and N2. Alternatively, the transmission 44 may be operated to have a pure hydrostatic power flow by disengaging both of the directional clutches 52, 54. Regardless, the transmission 24 may provide a seamless transition between ranges to provide work/road configurations as desired. In particular, speed changes from zero to the maximum speed within each speed range of the transmission 24 may be achieved in a smooth and continuous manner by automatically changing the swash plate angle of the pump 36 via control signals transmitted from the controller 44. For each speed range, substantially the full range of travel of the swash plate may be used. For example, in several embodiments, the swash plate may be at one end of its range of travel for zero speed within a specific speed range, may be at the other end of its range of travel for the maximum speed of that speed range and may be at a zero tilt or neutral position within its range of travel for an intermediate speed of that same speed range.

Referring still to FIG. 2, the transmission 24 may also include a parking brake 70 operably positioned on the load shaft 56. In several embodiments, the parking brake 70 may be communicatively coupled to the controller 44 (via a suitable communicative link 46) for automatic control thereof. For example, the controller 44 may be configured to proportionally or gradually engage the parking brake 70 as well as gradually release or disengage the parking brake 70. In such embodiments, the pressure of the hydraulic fluid supplied to the parking brake 70 may be controlled using an automatic valve (e.g., a proportional pressure reducing valve) configured to be operated via control signals transmitted from the controller 44. As is generally understood, the parking brake pressure may be inversely related to the parking brake torque.

Thus, contrary to the various clutches of the transmission 24, the parking brake 70 may be designed such that it is engaged when the pressure within the brake 70 is reduced and disengaged when the pressure within the brake 70 is increased.

In addition, for operation when the controller 44 is not powered or is not properly functioning, the parking brake 70 may also be configured to be engaged using a separate means. For instance, the parking brake 70 may be spring applied or may include any other suitable biasing means configured to bias the parking brake 70 into engagement. Alternatively, the parking brake 70 may include a suitable mechanical means for engaging the brake 70 when the controller 44 is not powered or is not properly functioning. Moreover, a means may be provided to store pressurized hydraulic fluid in the event the engine 23 stalls so that the parking brake 70 may remain released and/or may be applied and released several times if needed to control the vehicle 10 until the engine 23 can be restarted. Additionally, other means (e.g., a hand pump) may be provided to disengage the parking brake 70 if there is a fault and no stored pressurized hydraulic fluid is left within the system.

It should be appreciated that the configuration of the transmission 24 shown in FIG. 2 simply illustrates one example of a suitable transmission with which the disclosed system and method may be utilized. Thus, one of ordinary skill in the art should appreciate that application of the present subject matter need not be limited to the particular CVT configuration shown in FIG. 2, but, rather, the present subject matter may be advantageously used with various different CVT configurations.

Referring now to FIG. 3, a schematic diagram of one embodiment of a hydraulically operated clutch is illustrated in accordance with aspects of the present subject matter. The clutch is generally representative of a suitable configuration for the directional clutches 52 and 54, and the range clutches R1-R4 of the transmission 24 described above with reference to FIG. 2.

As shown, the hydraulically operated clutch may include an enclosure or can 72 that contains one or more clutch plates 74 coupled to an output shaft 76 and one or more clutch plates 78 coupled to an input shaft 80. In addition, the clutch may include both a clutch spring(s) 82 configured to hold the clutch plates 74, 78 apart and a fluid operated actuator (e.g., actuator 62 described above with reference to FIG. 2) configured to press the clutch plates 74, 78 together to engage the clutch.

Moreover, as shown in FIG. 3, pressurized fluid may be supplied to the actuator 62 by a proportional solenoid pressure reducing valve 84 (e.g., via fluid lines 86). The valve 84 may be configured to receive the pressurized fluid from a pump P of the vehicle 10 and may also be in fluid communication with a fluid tank 88 of the vehicle 10. As is generally understood, operation of the valve 84 may be automatically controlled by the vehicle controller 44 through the transmission of suitable control signals via the communication links 46. Each control signal may generally correspond to a current command associated with a specific electrical current value, which, in turn, may be directly proportional to the pressure of the hydraulic fluid supplied to the actuator 62 from the valve 84. Thus, by varying the current command, the controller 44 may directly control the clutch pressure supplied to the actuator 62 and, thus, control engagement/disengagement of the clutch.

Referring now to FIGS. 4 and 5, simplified graphs providing examples of the change in clutch pressure over time for both clutch engagement (FIG. 4) and clutch disengagement (FIG. 5) are illustrated in accordance with aspects of the present subject matter. As shown in FIG. 4, when engaging a clutch, the clutch pressure may be increase from a reduced pressure to an engagement pressure during a ramp phase (where the current command is ramped up) to ensure that clutch engagement is achieved in a controlled manner. As is generally understood, the initial clutch pressure may correspond to a zero pressure (i.e., when the clutch is fully dumped) or a fill pressure (e.g. a clutch pressure below the pressure at which the clutch plates 74, 78 begin to engage). For instance, in several embodiments, the clutch may be configured to be automatically quick-filled to the fill pressure prior to the ramp phase. Similarly, the engagement pressure may correspond to the clutch pressure at which the clutch is fully engaged (i.e., when there is no slippage across the clutch and the speed differential across the clutch is equal to zero). As is generally understood, the engagement pressure may vary depending on the configuration of the clutch as well as other factors (e.g., component wear, etc.). Additionally, as shown in FIG. 5, when disengaging a clutch, the clutch pressure is reduced from the engagement pressure to a reduced pressure (e.g., a zero pressure) as the hydraulic fluid is dumped from within the clutch.

Referring now to FIG. 6, a flow diagram of one embodiment of method 600 for enhancing the operation of a continuously variable transmission of a work vehicle is illustrated in accordance with aspects of the present subject matter. In general, the method 600 will be described with reference to the continuously variable transmission 24 described above with reference to FIG. 2. However, it should be appreciated by those of ordinary skill in the art that the disclosed method 600 may generally be utilized to enhance the operation of any CVT having any suitable configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

In general, the method 600 may allow for the operation of a CVT 24 to be enhanced by reducing the amount of time required to break-in and/or warm-up the transmission. Specifically, as will be described below, the disclosed method 600 allows for a computer-implemented clutch cycling routine to be performed in which one or more of the clutches of a CVT 24 are automatically and quickly cycled on and off (i.e., between engaged and disengaged states) to remove, reduce and/or eliminate any system inconsistencies, imperfections and/or other potential issues that may impact the overall performance and/or maintenance of the CVT 24, such as air trapped within the hydraulic system, friction within the clutch springs, plates, piston or valve, shifting of the clutch springs and/or other clutch components (e.g., due to initial wear on the clutch seals), burrs on metal components and/or any other potential issues. For instance, prior to performing a clutch calibration on a CVT 24, the disclosed method 600 may be performed to flush out any air bubbles/pockets contained within the hydraulic system and/or to address any mechanical issues within the transmission 24, which may improve the overall accuracy of the resulting clutch calibration. Accordingly, aspects of the present subject matter may be advantageously utilized, for example, by plant workers prior to performing the initial clutch calibration on a CVT 24 and/or by service technicians prior to performing a routine clutch calibration.

As shown in FIG. 6, at (602), the method 600 includes receiving a signal associated with initiating a clutch cycling routine. Specifically, in several embodiments, the controller 44 may be configured to receive a user input command or signal instructing the controller 44 to cycle one or more of the CVT clutches between engaged and disengaged states. For example, the operator may be provided with a suitable means within the cab 18 for selecting a clutch cycling mode (e.g., via a button, touch screen or other suitable user input device) within which the disclosed clutch cycling routine is automatically performed by the controller 44.

Additionally, at (604), the method 600 includes receiving a signal associated with selecting a forward travel direction or a reverse travel direction for the work vehicle. Specifically, in several embodiments, the operator of the work vehicle 10 may select which directional clutch 52, 54 is to be cycled by selecting the corresponding forward or reverse travel direction via the FRNP lever 20. For example, if it is desired for the forward directional clutch 52 to be cycled, the operator may be required to select forward using the FNRP lever 20, which, in turn, causes the forward directional clutch 52 to be engaged within the transmission 24.

It should be appreciated that, in several embodiments of the present subject matter, the forward or reverse travel direction may selected before or after instructing the controller 44 to enter into the clutch cycling mode. For instance, when the clutch cycling mode is initiated, a message window may, in one embodiment, be displayed (e.g., via the display panel 22) that prompts the operator to select forward or reverse by moving the FNRP lever 20 to the appropriate position. It should also be appreciated, that in alternative embodiments, any other suitable input device may be utilized by an operator to select the forward or reverse travel direction, such as push buttons, a control panel or any other suitable input device.

Referring still to FIG. 6, at (606), the method 600 includes engaging the parking brake 70 of the work vehicle 10. Specifically, in several embodiments, the parking brake 70 may be engaged to prevent vehicle movement while the driveline 28 is disengaged during cycling of the selected directional clutch 52, 54. However, in other embodiments, the clutch cycling routine may be performed without engaging the parking brake 70. In such instance, the work vehicle 10 may be allowed to move slightly during the performance of the disclosed method 600.

Additionally, at (608), the method 600 includes engaging a range clutch of the CVT 24 (e.g., range clutch R1, R2, R3 or R4). Specifically, in several embodiments, the disclosed clutch cycling routine may be configured to be performed in a "powered zero" operating mode in which the drivetrain 28 is engaged while the ground speed of the work vehicle 10 is maintained at or substantially at zero. In the "powered zero" mode, both a directional clutch 52, 54 and a range clutch R1-R4 must be engaged. Thus, when the FRNP lever 20 is moved to the forward or reverse position and the corresponding directional clutch 52, 54 is engaged within the transmission 24, one of the range clutches R1-R4 may also be engaged to constrain the planetary gear unit 32. For instance, given the configuration of the CVT 24 described above with reference to FIG. 2, the R1 range clutch or the R3 range clutch may be engaged together with the selected directional clutch 52, 54 to command the "powered zero" mode. However, with other CVT configurations, any other suitable range clutch(es) may be engaged in combination with the selected directional clutch 52, 54 to command the "powered zero" mode.

Referring still to FIG. 6, (at 610), the method 600 includes cycling the selected directional clutch 52, 54 between an engaged state and a disengaged state while the range clutch R1-R4 (and, optionally, the parking brake 70) is maintained in engagement. For instance, if the operator selects the forward travel direction, the forward directional clutch 52 will be engaged. Thereafter, the controller 44 may be configured to repeatedly cycle the forward directional clutch 52 between engaged and disengaged states (i.e., by transmitting suitable control signals to the corresponding clutch valve 84) in order to remove, reduce, and/or eliminate any issues that may impact the performance of the transmission 24, such as air trapped within the hydraulic system and/or any mechanical issues.

As used herein, the term "engaged state" refers to a clutch operating state in which at least some amount of torque is transmitted through the clutch. Thus, to cycle one of the directional clutches 52, 54 to the engaged state, the hydraulic pressure within the clutch may be increased to the appropriate pressure (e.g., the engagement pressure of FIG. 4) such that the clutch is engaged. In several embodiments, when cycling a clutch to the engaged state, it may be desirable to increase the pressure to the maximum clutch pressure or system pressure so that the clutch is fully engaged (i.e., when the clutch is fully locked up and fully transmitting torque). Similarly, the term "disengaged state" refers to a clutch operating state in which the clutch is fully disengaged (i.e., no torque can be transmitted through the clutch). Thus, to cycle one of the directional clutches 52, 54 to the disengaged state, the hydraulic pressure within the clutch may be reduced to the appropriate pressure such that the clutch is disengaged. For example, in several embodiments, the hydraulic fluid may be fully dumped to a achieve a zero pressure within the clutch when cycling to the disengaged state.

When cycling each directional clutch 52, 54 between the engaged and disengaged states, a slight delay period may be provided to ensure that the clutch is fully engaged or fully disengaged prior to subsequently decreasing or increasing the clutch pressure. For instance, if the hydraulic pressure is being reduced down to zero pressure in order to cycle the clutch to the disengaged state, the controller 44 may be configured to wait a short time period (e.g., time period 90 shown in FIGS. 4 and 5) to ensure that the clutch has fully disengaged prior to cycling the clutch back to the engaged state. Once the time period has lapsed, the hydraulic pressure may be increased to the engagement pressure in order to cycle the clutch to the engaged state. Thereafter, the controller 44 may be configured to wait another short time period (e.g., time period 92 shown in FIGS. 4 and 5) to ensure that the clutch has fully engaged prior to cycling the clutch back to the disengaged state.

When performing the disclosed clutch cycling routine, the controller 44 may, in several embodiments, be configured to continuously cycle the selected clutch between the engaged and disengaged states until the routine is cancelled. For instance, the operator may provide a suitable user input (e.g., via a button, touch screen or other suitable user input device) to terminate the clutch cycling. Similarly, the clutch cycling routine may also be cancelled if the operator commands movement of the work vehicle 10. For instance, if the operator pushes the speed lever (not shown) forward to increase the speed of the vehicle 10, the clutch cycling routine may be cancelled and the appropriate directional clutch engaged to allow the vehicle 10 to move in the selected direction.

Additionally, the operator may also be allowed to switch from cycling one directional clutch 52, 54 to the other while in the clutch cycling mode. For instance, if the forward directional clutch 52 is currently being cycled, the operator may select the reverse travel direction for the work vehicle (e.g., by moving the FRNP lever 20 to the reverse position) to initiate cycling of the reverse directional clutch 54. In doing so, the forward directional clutch 52 may be immediately disengaged. Thereafter, the reverse directional clutch 54 may be engaged and subsequently cycled between the engaged and disengaged states.

Referring still to FIG. 6, at (612), the method 600 includes controlling the position of the swash plate 48 of the CVT 24 such that the ground speed of the work vehicle 10 is maintained at or substantially at zero while the directional clutch 52, 54 is being cycled. Specifically, in several embodiments, the swash plate angle may be controlled such that there is no slippage or speed differential across the clutch being cycled, thereby ensuring that ground speed of the work vehicle 10 is maintained at or substantially at zero. As indicated above, the swash plate angle may be automatically controlled via the controller 44 by transmitting suitable control signals (e.g., current commands) to the swash plate actuator 64 of the transmission 24.

It should be appreciated that, in several embodiments, the ground speed of a work vehicle 10 is maintained "substantially at zero" if the ground speed is less than a predetermined speed threshold. For instance, in one embodiment, the speed threshold may correspond to a ground speed of less than 2 kilometers per hour (KPH), such as less than 1.5 KPH or less than 1 KPH. Additionally, a time component may also be combined with the speed threshold to determine whether the ground speed of the work vehicle is maintained "substantially at zero." For instance, in several embodiments, the ground speed is maintained "substantially at zero" as long as the ground speed does not exceed the predetermined speed threshold for a predetermined time period, such as by exceeding 1.5 KPH for 0.1 seconds or by exceeding 0.8 KPH for 0.2 seconds.

It should also be appreciated that any suitable sensor feedback may be provided to the controller 44 to ensure that the angle of the swash plate 48 is properly adjusted in order to maintain the ground speed of the work vehicle 10 at or substantially at zero. For instance, the controller 44 may be configured to correlate the current commands transmitted to the swash plate actuator 64 to a corresponding output speed of the fluid motor 40 (e.g., by monitoring the motor speed via a speed sensor(s) 68). The swash plate angle may then be controlled to ensure that the appropriate motor speed is achieved for maintaining the ground speed at or substantially at zero.

Additionally, it should be appreciated that, although the method 600 was described above with reference to cycling one or both of the directional clutches 52, 54, a similar methodology may also be utilized to cycle one or more of the range clutches R1-R4 of the transmission 24. For instance, when the operator selects the forward or reverse travel direction and the corresponding directional clutch 52, 54 is engaged, one of the range clutches R1-R4 may be cycled between engaged and disengaged states while the directional clutch 52, 54 is maintained in engagement and the swash plate angle is controlled in a manner that provides for a ground speed that is at or substantially at zero. For instance, referring to the CVT configuration shown in FIG. 2, while the forward or reverse directional clutch 52, 54 is engaged, the R1 or R3 range clutch may be cycled between engaged and disengaged states to remove trapped air and/or eliminate mechanical issues associated with the clutch.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for enhancing the performance of a continuously variable transmission of a work vehicle, the method comprising:
   engaging a range clutch of the continuously variable transmission;
   cycling a directional clutch of the continuously variable transmission between an engaged state and a disengaged state while the range clutch is engaged;
   controlling a position of a swash plate of the continuously variable transmission such that a ground speed of the work vehicle is maintained substantially at zero while the directional clutch is cycled between the engaged and disengaged states and
   maintaining a parking brake of the work vehicle engaged while the directional clutch is cycled between the engaged and disengaged states.

2. The method of claim 1, wherein the directional clutch is cycled to the engaged state by increasing a hydraulic pressure within the directional clutch to a pressure at which the directional clutch is fully engaged.

3. The method of claim 1, wherein the directional clutch is cycled to the disengaged state by decreasing a hydraulic pressure within the directional clutch to a pressure at which the directional clutch is fully disengaged.

4. The method of claim 1, further comprising: receiving a user input associated with initiating the cycling of the directional clutch between the engaged and disengaged states.

5. The method of claim 4, further comprising receiving a signal associated with a selection of a forward travel direction or a reverse travel direction for the work vehicle.

6. A computer-implemented method for enhancing the performance of a continuously variable transmission of a work vehicle, the method comprising:
   engaging a range clutch of the continuously variable transmission;
   cycling a directional clutch of the continuously variable transmission between an engaged state and a disengaged state while the range clutch is engaged;
   controlling a position of a swash plate of the continuously variable transmission such that a ground speed of the work vehicle is maintained substantially at zero while the directional clutch is cycled between the engaged and disengaged states, wherein controlling the position of the swashplate such that the ground speed is maintained substantially at zero comprises adjusting an angle of the swashplate such that there is no slippage across the directional clutch when the directional clutch is in the engaged state.

7. A computer-implemented method for enhancing the performance of a continuously variable transmission of a work vehicle, the method comprising:
   engaging a range clutch of the continuously variable transmission;
   cycling a directional clutch of the continuously variable transmission between an engaged state and a disengaged state while the range clutch is engaged;
   controlling a position of a swash plate of the continuously variable transmission such that a ground speed of the work vehicle is maintained substantially at zero while the directional clutch is cycled between the engaged and disengaged states, wherein cycling the directional clutch between the engaged and disengaged states comprises repeatedly cycling the directional clutch between the engaged and disengaged states.

8. The method of claim 7, wherein the directional clutch is a forward directional clutch of the continuously variable transmission, further comprising:
disengaging the forward directional clutch and engaging a reverse directional clutch of the continuously variable transmission;
cycling the reverse directional clutch between an engaged state and a disengaged state while the range clutch is engaged; and
controlling the position of the swash plate such that the ground speed is maintained substantially at zero while the reverse directional clutch is cycled between the engaged and disengaged states.

9. The method of claim 8, further comprising receiving a signal associated with a selection for a forward travel direction or a reverse travel direction for the work vehicle.

10. A system for enhancing the performance of a work vehicle, the system comprising:
a continuously variable transmission including a first directional clutch, a second directional clutch and a plurality of range clutches, the continuously variable transmission further including a hydrostatic power unit having a pump in fluid communication with a motor, the pump including a swash plate; and
a controller communicatively coupled to the first directional clutch, the second directional clutch, the plurality of range clutches and the hydrostatic power unit, the controller being configured to:
engage one of the plurality of range clutches;
cycle the first directional clutch between an engaged state and a disengaged state while the range clutch is engaged;
control a position of the swash plate such that a ground speed of the work vehicle is maintained substantially at zero while the first directional clutch is cycled between the engaged and disengaged states; and
a parking brake communicatively coupled to the controller, the controller being configured to maintain the parking brake in engagement while the first directional clutch is cycled between the engaged and disengaged states.

11. The system of claim 10, wherein the controller is further configured to receive a user input associated with initiating the cycling of the first directional clutch between the engaged and disengaged states.

12. The system of claim 10, wherein the controller is further configured to receive a signal associated with a selection of a forward travel direction or a reverse travel direction for the work vehicle.

13. A system for enhancing the performance of a work vehicle, the system comprising:
a continuously variable transmission including a first directional clutch, a second directional clutch and a plurality of range clutches, the continuously variable transmission further including a hydrostatic power unit having a pump in fluid communication with a motor, the pump including a swash plate; and
a controller communicatively coupled to the first directional clutch, the second directional clutch, the plurality of range clutches and the hydrostatic power unit, the controller being configured to:
engage one of the plurality of range clutches;
cycle the first directional clutch between an engaged state and a disengaged state while the range clutch is engaged;
control a position of the swash plate such that a ground speed of the work vehicle is maintained substantially at zero while the first directional clutch is cycled between the engaged and disengaged states; and
wherein the controller is configured to maintain the ground speed substantially at zero by adjusting an angle of the swash plate such that there is no slippage across the first directional clutch when the first directional clutch is in the engaged state.

14. The system of claim 13, wherein the controller is further configured to receive a user input associated with initiating the cycling of the first directional clutch between the engaged and disengaged states.

15. The system of claim 13, wherein the controller is further configured to receive a signal associated with a selection of a forward travel direction or a reverse travel direction for the work vehicle.

16. The system of claim 13, wherein the controller is configured to repeatedly cycle the first directional clutch between the engaged and disengaged states.

17. The system of claim 13, wherein the first directional clutch is a forward directional clutch of the continuously variable transmission, the controller being further configured to:
disengage the forward directional clutch and engage a reverse directional clutch of the continuously variable transmission;
cycle the reverse directional clutch between an engaged state and a disengaged state while the range clutch is engaged; and
control the position of the swash plate such that the ground speed is maintained substantially at zero while the reverse directional clutch is cycled between the engaged and disengaged states.

* * * * *